United States Patent [19]

Carpenter et al.

[11] Patent Number: 5,527,848
[45] Date of Patent: Jun. 18, 1996

[54] PACIFICATION OF OPTICALLY VARIABLE PIGMENTS FOR USE IN WATERBORNE COATING COMPOSITIONS

[75] Inventors: Clint W. Carpenter, Royal Oak; S. Kendall Scott, Allen Park, both of Mich.

[73] Assignee: BASF Corporation, Southfield, Mich.

[21] Appl. No.: 355,572

[22] Filed: Dec. 14, 1994

[51] Int. Cl.$^6$ ........................................... C08K 3/10
[52] U.S. Cl. ..................... 524/403; 524/398; 524/399; 524/406; 524/408; 524/413; 523/200; 428/403; 428/404; 428/407
[58] Field of Search ..................... 524/403, 406, 524/408, 413, 398, 399; 428/403, 407, 404; 523/200

[56] References Cited

U.S. PATENT DOCUMENTS 5,135,812  8/1992  Phillips ................................. 428/403

*Primary Examiner*—Edward J. Cain
*Attorney, Agent, or Firm*—Anne Gerry Sabourin

[57] ABSTRACT

The present invention is a composition comprising an optically variable pigment modified with metal salt selected from the group consisting of salts of transition metals having atomic numbers 21–28; 39–42; 57 and 72–74; and salts of the lanthanide series of rare earth metals having atomic numbers of from 58 to 71. The invention also includes a method for forming the surface treated pigments and coating compositions containing the pigments.

10 Claims, No Drawings

PACIFICATION OF OPTICALLY VARIABLE PIGMENTS FOR USE IN WATERBORNE COATING COMPOSITIONS

BACKGROUND OF THE INVENTION

Field of the Invention

The present invention relates to the field of surface treated optically variable pigment. More particularly, the present invention relates to pacification of optically variable pigments for use in waterborne coating compositions.

The use of optically variable pigments has been described in the art for a variety of applications, such as inks for counterfeit-proof applications such as currency, and generically for coating compositions. They are described, for example, in U.S. Pat. Nos. 4,434,010, 4,704,356, 4,779,898, 4,838,648, 4,930,866, 5,059,245, 5,135,812, 5,171,363, and 5,214,530.

Optically-variable thin-film pigment flakes are prepared by depositing onto a flexible web combinations of transparent dielectric layers, semi-opaque metal layers, and metal reflecting layers to form a multilayer thin film interference structure. The interference structure typically has at least one metal reflecting layer, at least one transparent dielectric layer and at least one semi-transparent metal layer. Various combinations of these layers can be utilized to achieve the desired optically variable effect. In a preferred embodiment, the interference structure produces a dichroic optical effect and has in order, on one side of the metal reflecting layer, at least one transparent dielectric layer and at least one semi-transparent metal layer. In a particularly preferred embodiment, this layer structure is symmetrical on both sides of the metal reflecting layer.

Aluminum is often used as the metal reflecting layer for a variety of reasons such as its cost and commercial availability, although other materials, such as gold, copper, or silver can also be used. The semi-opaque metal layer can be formed from metals such as chromium or nickel. The transparent dielectric layers can be formed from materials such as silicon dioxide, magnesium fluoride, or aluminum oxide. Layer thicknesses can be varied according to the particular desired characteristics of the pigment. For example, U.S. Pat. No. 5,135,812 describes useful thicknesses being on the order of 80 nm for the metal reflecting layer, 5 nm for the semi-opaque metal layers, and thicknesses of a plurality of halfwaves of the particular design wavelength for the transparent dielectric layers.

As mentioned above, the optically-variable thin-film pigment flakes are prepared by coating the semi-transparent metal layers, transparent dielectric layers, and metal reflecting layer onto a flexible web, and separating the web from the multilayer structure to form the pigment flakes. The web is typically a polymer material, such as polyvinyl alcohol or polyethyleneterephthalate. The separation can be accomplished by stripping the multilayer structure from the web, in which case a stripping layer, as is known in the art, is preferably deposited onto the web prior to the other layers. Heat and/or solvent may be used to facilitate the stripping process. Alternatively, the web may be dissolved in a suitable solvent (aqueous or organic, depending on the solubility of the web material) to accomplish the separation. The coated web may optionally be cut or shredded to more easily fit into a container prior to the dissolution step.

As the multilayer structure is separated from the web, it typically breaks into flakes of irregular shapes and sizes. These flakes will usually require further processing to achieve the size requirements for use in a coating composition. This can be accomplished by techniques known in the art, such as ultrasonic agitation, milling, or grinding. It may be preferred to use various combinations of solvents, surfactants, and/or resins during the size reduction process, as is known in the art. The optically variable pigments are capable of producing dramatic visual effects, including dichroic effects not observed in other types of pigments.

The present invention relates to compounds that are useful for surface modification and corrosion inhibition of optically variable pigment particles used in waterborne coating compositions, particularly automotive coating compositions. The invention further relates to decorative coatings formed from aqueous compositions containing surface modified optically variable pigments.

Waterborne automotive paints are gaining widespread usage in the automotive industry due to concerns over organic solvent emissions during application of paints. The new waterborne paints have the disadvantage of using a medium which is corrosive to metallic pigments, such as the optically variable pigments. For example the pH of the waterborne acrylic coating compositions typically ranges from 8.0–9.0, and the polyurethane coating compositions have a pH typically ranging from 7.5 to 8.0. In a basic pH environment, the optically variable pigment is oxidized. The oxidation is a form of corrosion which attacks the exposed metallic surfaces of the optically variable pigment particles. Oxidation of the exposed metallic surfaces affects the light absorbing quality of the chromium and the reflecting quality of the reflective layer. Oxidation of the metallic layers results in the evolution of hydrogen gas. The amount of hydrogen gas evolved is indicative of the amount of oxidation (i.e. corrosion) of the pigment. The hydrogen gas may accumulate in the paint. Furthermore, when a paint with oxidized optically variable pigments is coated onto a substrate, the coating shows discoloration, a significant loss of chroma, a shift in hue and diminished metallic effect.

Deterioration of optically variable pigment may accelerate over time due to continuous contact with the basic pH environment of the coating composition. Coating compositions containing the optically variable pigments are often stored for 6 months or more before application, which can result in significant corrosion of the pigment. If this corrosion remains unchecked the coating composition may be unusable.

Following application of the coating containing optically variable pigment to a substrate, color shift may occur in the coating when exposed to humidity, due to swelling of the dielectric layer of the pigment.

Treatment of optically variable pigment with the compounds of the present invention reduces oxidation of the pigment in waterborne paints. The surface modification of the optically variable pigment is also effective to reduce color change of cured paint films upon exposure to humidity, by protecting the dielectric layers in the pigment. Due to the multi-layer construction and the multi-metal content of the pigment, it was unexpected that surface treated pigments according to the present invention would retain the dichroic effect, and demonstrate decreased gassing and improved humidity resistance.

SUMMARY OF THE INVENTION

The present invention provides, in one aspect a class of compounds for use in surface treatment of optically variable pigment particulate to reduce gassing of the pigment in waterborne coating compositions and to improve the humidity resistance of cured films formed from the coating composition. By the term "optically variable pigment" as used throughout this specification and the appended claims is meant pigments which are prepared by depositing inorganic transparent dielectric layers, semi-transparent metal layers, and metal reflecting layers onto a flexible web, and separating the layers from the web in such a manner as to fragment the deposited thin film layer structure into pigment particles. These particles are in the form of irregularly-shaped flat pigment flakes.

The compounds used in the treatment of optically variable pigment particles include transition metal salts, rare earth metal salts or mixtures thereof in solution, to inhibit corrosion in a basic pH environment, as evidenced by decreased hydrogen gassing. The particularly useful transition metal and rare earth metal salts include transition metals having atomic numbers 21–28; 39–42; 57 and 72–74; and the lanthanide series of rare earth metals having atomic numbers of from 58 to 71.

The optically variable pigment particles are treated with the metal salt by forming a slurry of pigment, metal salt, water and solvent. The pigment remains in solution for a period of time sufficient to allow formation of the protective metallic oxide coating on the optically variable pigment. Following the treatment, the pigment is separated from the liquid and washed. The pigment is then oven dried.

DETAILED DESCRIPTION OF THE INVENTION

The present invention is an optically variable pigment surface treated with a transition metal salt, a rare earth metal salt, or mixture thereof, a method for treating the optically variable pigment and a coating containing the treated pigment.

The optically variable pigment particles of the present invention as contemplated for use in a coating composition have a particle size on average from 5 to 40 μm No more than 10% of the particles have a particle size of greater than 50 μm and substantially none of the particles has a particle size larger than 125 μm.

For purposes of the present invention, the optically variable pigment may be heat treated, prior to the surface treatment according to the invention. However, heat treatment is not necessary to provide a pigment with reduced gassing in coatings and to provide cured films with improved humidity resistance.

According to the present invention, the optically variable pigment is treated with a salt selected from the group consisting of transition metal salts, rare earth metal salts and mixtures thereof in a solution comprising water and solvent. Preferably, the salt is selected from the group consisting of salts of transition metals having atomic numbers 21–28; 39–42; 57 and 72–74; and salts of the lanthanide series of rare earth metals having atomic numbers of from 58 to 71. Most preferably the salts used for treating the pigment are chromium salts, vanadium salts, molybdenum salts and cerium salts. Examples of suitable chromium salts are tetravalent chromium salts such as sodium dichromate and ammonium dichromate. Suitable cerium salts include cerium (IV) sulfate, cerium triacetate, cerium (IV) isopropoxide, ammonium cerium (IV) nitrate and cerium dioxide. Suitable vanadium salts include ammonium metavanadate, vanadium (V) oxide, sodium metavanadate, sodium orthovanadate and vanadyl acetylacetonate. Suitable molybdenum salts include disodium molybdate, molybdic acid and phosphomolybdic acid. The metal salt is utilized in an amount between 0.01% and 30.0% by weight based on total pigment weight. Preferably the salt is utilized in an amount between 1.0 and 25.0 percent by weight based on total pigment weight.

The salt solution preferably contains deionized water and a solvent such as butyl cellosolve, n-propanol, propylene glycol monomethyl ether or propylene glycol mono butyl ether. The water is present to dissolve the metal salt. The solvent is present to effectively disperse the pigment particles to allow maximum contact of the pigment particles with the salt solution. Preferably water and solvent are present in a ratio of from 10:90 to 50:50 and most preferably in a ratio of 20:80 respectively.

The pigment and salt solution are combined to form a slurry. The slurry comprises pigment present in an amount between 2.0% and 20% by weight, metal salt present in an amount between 0.5% and 20.0% by weight, water present in an amount between 10.0% and 80.0% by weight, and solvent present in an amount between 90.0% and 10.0% by weight, where all weights are based on total weight of the pigment slurry. The pigment remains in contact with the salt solution for a period of 1 minute to 24 hours. The contact time must be adequate for formation of a metal oxide coating on the pigment reflective layer. The mixture may be heated to a temperature of up to 92° C., to expedite formation of the metal oxide protective coating. In a preferred embodiment a pigment slurry containing the metal salt is heated to a temperature of between 60° C. and 92° C. for a period of 90 minutes. The pigment is subsequently washed with a polar solvent. The pigment is then filtered and dried to provide the metal treated optically variable pigment composition. The pigment may be air or oven dried. Oven drying is conducted at between 100° C. and 110° C. for between 15 minutes and one hour.

The surface modified optically variable pigment is useful in aqueous coating compositions to significantly reduce gassing and improve humidity resistance of the pigment in a coating composition. Coatings containing the surface modified optically variable pigment have shown improved rheology in comparison to those containing untreated pigment. Coatings containing optically variable pigment that has been surface treated according to the present invention show excellent viscosity stability. Under some test conditions, heat treated optically variable pigments, surface treated according to the present invention, maintain stable viscosity longer than heat treated pigments not otherwise treated.

The optically variable pigment may be combined with a film-forming resin and water to form a waterborne paint composition. The optically variable pigment is included in a pigment to binder ratio of from 0.03:1 to 0.40:1.

Other ingredients well-known in the art to be useful in such compositions may be included such as crosslinkers and other resins; plasticizers; additional cosolvents to aid in stabilization or application of the composition; rheology control agents; other pigments; UV light stabilizers and antioxidants; catalysts; fungicides; and so on.

Suitable film-forming resins are water-dispersible or water-soluble ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are incorporated herein by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, Mo.; and American Cyanamid, Wayne, N.J. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

Additional cosolvents may be added to aid in stabilization or application of the composition. The more preferred solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

Other pigments, if used, are preferably incorporated as pastes or dispersions prepared by using grinding resins or pigment dispersants according to methods well known in the art. The term "pigments" is meant to encompass organic and inorganic compounds that are colored materials, fillers, flake materials, and other materials of kind that the art normally names as pigments. If pigments other than the transition metal or rare earth metal treated optically variable pigment are included, they are can be used in an amount of up to 99.0% by weight and preferably are used in an amount between 1.0 and 50.0% by weight, based on the total pigment weight. The surface-modified optically variable pigments used according to the invention can be used in amounts of between 1.0 and 99.0% by weight, based on the total pigment weight. Preferably, the surface-modified optically variable pigments are used in amounts between 50.0 and 100.0% by weight, based on total pigment weight.

It may be desirable to include small amounts of rheology control agents, for example fumed silicas, hectorite clays, bentonite clays, or cellulosics like cellulose acetate butyrate. Such materials are usually used at levels of less than 10.0% based on the total solid weight of reactants. Rheology control agents are used to control the flow and leveling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 siphon spray gun (available from Binks Manufacturing Corp., Franklin Park, Ill.) with 50-80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited for use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°–150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat and is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

Basecoat compositions containing optically variable pigment were prepared according to the present invention and tested for gassing to determine corrosion resistance of the optically variable pigment in the basic pH environment of the coating. The compositions were also tested for rheology control and shelf life. The cured coatings were tested for humidity resistance. The test results are set forth in Tables 1–11.

The coating compositions were tested for gassing in a gassing apparatus which is a 250 ml washing bottle attached to a bubble counter with two chambers. A 250 ml sample of basecoat coating composition containing optically variable or other pigment is placed in the washing bottle. The lower chamber of the bubble counter is filled with water through the side neck of the bubble counter. The amount of hydrogen gassing is measured by the volume of water displaced from the lower chamber into the upper chamber. The assembled apparatus containing the coating is placed in a 38° C. bath and allowed to equilibrate for 30 minutes. After allowing for equilibration, the screw cap is tightened securely. The sample is tested in the bath at set intervals to measure the amount of hydrogen gas generated.

The following examples are provided to further illustrate the invention.

EXAMPLES

A coating composition was prepared as set forth herein below. Optically variable pigments as prepared in examples 1–14 were added to fourteen (14) samples of the same basecoat composition and tested for gassing. The coating samples were designated as 1a–14a respectively. The coating samples were evaluated for gassing, and the results were set forth in Tables 1–10, below.

| Waterborne Basecoat Composition | |
|---|---|
| Ingredient | Amount (Wt. %) |
| Rheology Control Agent | 27.61 |
| Melamine-Formaldehyde Resin Cymel ® 327 | 3.97 |
| Butyl Cellosolve | 0.79 |
| Anionic Polyurethane Resin | 45.36 |
| Pigment Dispersion- Carbon Black in Anionic Polyurethane Grind Resin | 5.74 |
| Surfactant Flow Additive | 0.87 |
| Tinuvin ® 1130 UV Absorber | 0.33 |
| Branched Polyester Slurry Resin | 5.94 |
| Propyl propasol | 2.68 |
| Optically Variable Pigment* | 1.39 |
| Dimethylethanolamine (5% solution) | 2.56 |
| Deionized water | 2.76 |
| Total | 100.00 |

*indicates Cyan/Purple optically variable pigment

EXAMPLE 1

Untreated Optically Variable Pigment (Control 1)

Optically variable pigment for the control was used as received from the manufacturer.

EXAMPLE 2

Optically Variable Pigment Treated with Sodium Dichromate

Sodium dichromate, 1.60 grams, was dissolved in 10.01 grams of deionized water. 40.17 grams of butyl cellosolve and 6.2 grams of untreated optically variable pigment were combined to form a slurry. The salt solution was then added to the pigment slurry and stirred with heating at 92° C. for 1.5 hours. The pigment was separated from the liquid by filtration and washed with isopropanol and water, followed by washing with isopropanol alone. The pigment was oven dried for one half hour at 110° C.

Pigments for Ex. 1 and 2 are from the same batch.
Gassing Results for Coating Examples 1a and 2a Coating Examples 1a and 2a were prepared by adding pigments prepared according to Examples 1 and 2 respectively, to the basecoat formulation set forth hereinabove. A gassing test was conducted as described herein above, over a period of four weeks. The results were as follows.

TABLE 1

Gassing Results for Ex. 1a and 2a

| COATING | GASSING TEST RESULTS OVER TIME | | | |
|---|---|---|---|---|
| | DAY 1 | 1 Week | 2 Weeks | 4 Weeks |
| 1a (Control) | 22 | 54 | 60 | 70 |
| 2a | 0 | 4 | 5 | 9 |

Humidity Resistance

All humidity resistance tests were conducted as follows. Panels were prepared for the humidity test by spray application of the waterborne basecoat composition set forth above, onto primed metal panels, followed by flash drying for 10 minutes at 60° C. The coatings were then baked for 20 minutes at 129° C. to cure to a hard durable coating having a basecoat thickness of 15–20 μm.

Color change was measured on the panels by a 16 hour, 140° F. QCT Humidity Test. The measurements on the table indicate the difference in color on a single coated panel between a section of the panel exposed to humidity and an unexposed section of the panel. The color differences were measured on a Pacific Scientific Spectroguard II spectrophotometer, d/8 geometry, specular included, large area view, illuminant D65, 10° Observer, using 1976 CIEL* a* b* color difference functions.

*1976 CIEL* a* b* indicates the color space used.

TABLE 2

Humidity Resistance/Color Change for Coatings Ex. 1a–2a

| SAMPLE | ΔL* | ΔC* | ΔH* | ΔE* |
|---|---|---|---|---|
| 1a | 1.22 | 0.73 | −2.51 | 2.88 |
| 2a | 0.50 | 0.70 | −0.45 | 0.97 |

ΔL* indicates change in lightness.
ΔC* indicates change in chrome.
ΔH* indicates change in hue.
ΔE* indicates total color difference.

EXAMPLE 3

Untreated Optically Variable Pigment (control)

Pigment was used as received from the manufacturer. Pigments treated in Ex. 4–6 were from same batch as control.

EXAMPLE 4

Optically Variable Pigment Treated with Ammonium Dichromate 3.21 grams of ammonium dichromate were dissolved in 20.0 grams of deionized water. 79.6 grams of butyl cellosolve were added to the mixture, with stirring. To this mixture was added, with stirring for 1 hour at 65° C., 19.9 grams of untreated optically variable pigment to form a slurry. The slurry was then filtered to remove the solvent and water, and washed first with isopropanol and water, followed by washing with isopropanol. The pigment was oven dried for one half hour at 110° C.

EXAMPLE 5

Optically Variable Pigment Treated with Sodium Metavanadate 1.0 gram of sodium metavanadate was dissolved in 10.0 grams of deionized water. 40.2 grams of butyl cellosolve were added to the mixture, with stirring. To this mixture was added 10.1 grams of untreated optically variable pigment to form a slurry. The mixture was stirred for 1.5 hours. The slurry was then filtered to remove the solvent and water, and the optically variable pigment was washed with isopropanol and water followed by washing with isopropanol. The pigment was oven dried at 110° for one half hour.

EXAMPLE 6

Optically Variable Pigment Treated with Cerium Salt

Ammonium cerium (IV) nitrate, 1.05 grams, was dissolved in 10.0 grams deionized water. To this mixture was added 40.3 grams butyl cellosolve. 9.8 grams of untreated optically variable pigment were added to the solution and stirred for 1.5 hours. The slurry was then filtered to remove the solvent and water, followed by washing with isopropanol and water, and then washing with isopropanol. The pigment was oven dried for one half hour at 110° C.

Gassing Results for Coating Examples 3a–6a

Coating compositions 3a–6a were prepared using the basecoat formulation set forth hereinabove and the pigments prepared according to Examples 3–6 respectively.

TABLE 3

Gassing Results for Coating Examples 3a–6a

| COATING | GASSING TEST RESULTS OVER TIME | | |
|---|---|---|---|
| | DAY 1 | 1 Week | 2 Weeks |
| 3a (control | 24 | 60 | 69 |
| 4a | 1 | 10 | 10 |
| 5a | 0 | 22 | 30 |
| 6a | 1 | 3 | 6 |

TABLE 4

Humidity Resistance/Color Change for Coatings Ex. 4a–6a

| SAMPLE | ΔL* | ΔC* | ΔH* | ΔE* |
|---|---|---|---|---|
| 3a | 0.51 | 0.67 | −1.58 | 1.79 |
| 4a | 0.02 | −0.30 | −0.71 | 0.77 |
| 5a | 0.65 | 0.64 | −1.14 | 1.46 |
| 6a | 0.64 | −3.11 | −1.73 | 3.61 |

EXAMPLE 7

Optically Variable Pigment (Control)

Pigment was used as received from the supplier.

EXAMPLE 8

Heat Treated Optically Variable Pigment

Pigment was heat treated by supplier and used as received from supplier.

EXAMPLE 9

Optically Variable Pigment with Ammonium Dichromate

Part of the pigment from Example 4 was tested in this experiment.

Gassing Results for Ex. 7a–9a

Coating compositions 7a–9a were prepared using the basecoat formulation set forth hereinabove and the pigments prepared according to Examples 7–9 respectively.

TABLE 5

Gassing Results for Ex. 7a–9a

| SAMPLE | GASSING TEST RESULTS OVER TIME | | | |
|---|---|---|---|---|
| | DAY 1 | 1 Week | 2 Weeks | 4 Weeks |
| 7a | 24 | 55 | 65 | 75 |
| 7a | 0 | 2 | 23 | 43 |
| 7a | 0 | 7 | 10 | 15 |

Results indicate that the chromated pigment shows significantly less gassing after 2 weeks than the heat treated pigment not otherwise surface treated.

TABLE 6

Humidity Test Results/Color Change for Coatings 7a–9a

| SAMPLE | ΔL* | ΔC* | ΔH* | ΔE* |
|---|---|---|---|---|
| 7a | 0.32 | −0.34 | −1.34 | 1.41 |
| 8a | 0.02 | 0.15 | −0.04 | 0.15 |
| 9a | 0.69 | 0.65 | −0.45 | 1.05 |

EXAMPLE 10

Chromated aluminum pigment.

EXAMPLE 11

Untreated optically variable pigment as received from the supplier.

EXAMPLE 12

Heat treated optically variable pigment as received from supplier.

EXAMPLE 13

Heat Treated Optically Variable Pigment Treated with Ammonium Dichromate

Pigment that had been heat treated by the supplier was surface treated by the following process.

6.44 grams of ammonium dichromate were dissolved in 40.5 grams of deionized water. 159.7 grams of butyl cellosolve were added to the mixture, with stirring. To this mixture was added, with stirring for 1 hour at 65° C., 42.0 grams of heat treated optically variable pigment to form a slurry. The slurry was then filtered to remove the solvent and water, and washed first with isopropanol and water, followed by washing with isopropanol. The pigment was then oven dried at 110° C. for one half hour.

TABLE 7

Gassing Results for Ex. 10a–13a

| SAMPLE | GASSING TEST RESULTS OVER TIME | | |
|---|---|---|---|
| | DAY 1 | 1 Week | 2 Weeks |
| 10a | 2 | 2 | 3 |
| 11a | 24 | 91 | 104 |
| 12a | 3 | 4 | 7 |
| 13a | 2 | 3 | 4 |

TABLE 8

Humidity Test Results for Ex. 10a–13a

| SAMPLE | ΔL* | ΔC* | ΔH* | ΔE* |
|---|---|---|---|---|
| 10a | −0.03 | −0.01 | 0.02 | 0.04 |
| 11a | — | — | — | — |
| 12a | 0.06 | 0.00 | 0.11 | 0.12 |
| 13a | −0.30 | −0.57 | 0.28 | 0.70 |

Rheology Control Testing

Basecoat compositions were prepared using pigments from Examples 10–13. The samples were each divided into two batches for testing. Rheology tests were conducted by reducing coating samples to 100 cps at 390 l/sec (setting=6/2) using the Bohlin V88. Rheological tests were run as shown in the table below, using the Bohlin CS instrument. Measurements were taken at different shear rates, with the shear ramping from low to high and then back to low shear. The table below sets forth data for the viscosity at low shear (1 reciprocal second), as the instrument was ramping back to low shear.

TABLE 9

Rheology Control Data for Ex. 10a–13a Test Batch 1

| | VISCOSITY IN CPS AT SHEAR OF 1/SEC SAMPLES | | | |
|---|---|---|---|---|
| TIME | 10a | 11a | 12a | 13a |
| INITIAL | 3389 | 1110 | 2307 | 2407 |
| 1 WEEK SHELF | 2315 | 455 | 1841 | 2192 |
| 1 WEEK SHELF + ULTRA TURRAX | 4210 | 1533 | 3180 | 3568 |
| ABOVE + 2 WK SHELF (3 WK TOTAL) | 3574 | 817 | 3056 | 4223 |
| ABOVE + 5 WK SHELF (6 WK TOTAL) | 3763 | 717 | 3165 | 4400 |

TABLE 10

Rheology Control Data for Ex. 10a–13a Test Batch 2

| | VISCOSITY IN CPS AT SHEAR OF 1/SEC SAMPLES | | | |
|---|---|---|---|---|
| TIME | 10a | 11a | 12a | 13a |
| HOT BOX* | 1801 | 281 | 1366 | 1927 |
| HOT BOX + ULTRA TURRAX | 4497 | 978 | 3839 | 3963 |
| ABOVE + 2 WK SHELF (3 WK TOTAL) | 3075 | 819 | 2621 | 3672 |
| ABOVE + 5 WK SHELF (6 WEEK TOTAL) | 3531 | 843 | 1413 | 4136 |

*4 days at 110° C.

RHEOLOGY OF SPRAYED BASECOAT PAINTS EX. 10a–13a

Electrocoated panels were coated with basecoat compositions 10a–13a that had been subjected to hot box, ultra turrax and 5 additional weeks on the shelf, as set forth in Table 10. The test was repeated twice with the same results each time. These results are set forth in the following table.

TABLE 10

SAG RESULTS FOR SPRAYED PANELS FOR EX. 10a–13a

| SAMPLE | MAXIMUM FILM BUILD | SAG RESULTS |
|---|---|---|
| 10 | 0.8 mils | No Sag |
| 11 | — | Sags on hole at 1.30 mils |
| 12 | — | Sags on hole at 0.92 mils |
| 13 | 1.31 mils | No Sag |

We claim:

1. An aqueous coating composition, comprising:
   a. at least one water-compatible polymer,
   b. a crosslinking agent,
   c. optically variable pigment treated with a slurry of solvents selected from the group consisting of water, organic solvents and mixtures thereof, and at least one metal salt selected from the group consisting of salts of transition metals having atomic numbers 21–28; 39–42; 57 and 72–74; and salts of the lanthanide series of rare earth metals having atomic numbers of from 58 to 71.

2. The coating composition of claim 1, wherein the optically variable pigment modified with a metal salt includes the salt in an amount effective to protect the surface of the pigment particles from corrosion in an aqueous environment having a basic pH.

3. The coating composition of claim 1, wherein the optically variable pigment modified with a metal salt includes the salt in an amount between 1.0% and 30.0% by weight based on total pigment weight.

4. The coating composition of claim 1, wherein the pigment to binder ratio is from 0.03:1 to 0.40:1.

5. The coating composition of claim 1, wherein the optically variable pigment particles have an average particle size of between 5 and 40 μm.

6. The coating composition of claim 1, further comprising ingredients selected from the group consisting of wetting agents, surfactants, defoamers, antioxidants, UV absorbers, light stabilizers, plasticizers, and mixtures thereof.

7. The coating composition of claim 1, wherein the optically variable pigment is present in an amount between 1.0 and 100% by weight, based on total pigment weight.

8. The coating composition of claim 1, further comprising additional pigment present in an amount up to 99% by weight, based on total pigment weight.

9. The coating composition of claim 1, wherein the metal salts are selected from the group consisting of vanadium, chromium, molybdenum and cerium salts and mixtures thereof.

10. An aqueous coating composition comprising
   a. at least one water-compatible polymer,
   b. a crosslinking agent,
   c. optically variable pigment treated with a slurry of solvents selected from the group consisting of water, organic solvents and mixtures thereof, and at least one metal salt selected from the group consisting of vanadium, chromium, molybdenum and cerium salts and mixtures thereof.

* * * * *